US011390267B2

(12) United States Patent
Sauter et al.

(10) Patent No.: US 11,390,267 B2
(45) Date of Patent: Jul. 19, 2022

(54) METHOD AND CONTROLLER FOR OPERATING A MOTOR VEHICLE

(71) Applicant: ZF Friedrichshafen AG, Friedrichshafen (DE)

(72) Inventors: Michael Sauter, Tettnang (DE); Markus Eisele, Friedrichshafen (DE); Martin Dietrich, Rosengarten (DE); Michael Walser, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 155 days.

(21) Appl. No.: 16/794,549

(22) Filed: Feb. 19, 2020

(65) Prior Publication Data

US 2020/0263619 A1 Aug. 20, 2020

(30) Foreign Application Priority Data

Feb. 19, 2019 (DE) ............... 10 2019 202 210.3

(51) Int. Cl.
*B60W 20/00* (2016.01)
*B60W 20/16* (2016.01)
(Continued)

(52) U.S. Cl.
CPC ............ *B60W 20/16* (2016.01); *B60W 20/13* (2016.01); *F02D 41/029* (2013.01);
(Continued)

(58) Field of Classification Search
CPC .. B60W 20/13; F02D 2041/026; F01N 3/023; F01N 2430/00
See application file for complete search history.

(56) References Cited

U.S. PATENT DOCUMENTS

| 10,246,078 B2 | 4/2019 | Hemminger et al. |
| 2013/0213020 A1 | 8/2013 | Ishikawa et al. |
| 2019/0390620 A1* | 12/2019 | Dudar ............... F02D 29/06 |

FOREIGN PATENT DOCUMENTS

| DE | 10 2014 220 860 A1 | 4/2016 |
| DE | 10 2016 200 972 A1 | 7/2017 |

(Continued)

OTHER PUBLICATIONS

Machine translation of FR-2920474-A1, accessed Sep. 29, 2021. (Year: 2021).*

(Continued)

*Primary Examiner* — Jonathan R Matthias
(74) *Attorney, Agent, or Firm* — Finch & Maloney PLLC; Michael J. Bujold; Jay S. Franklin

(57) ABSTRACT

A method for operating a motor vehicle having an engine and an electric machine, a transmission, a battery, and an exhaust treatment system having a particulate filter. The battery discharges during a charge-depleting mode of the electrical machine and charges when the electrical machine operates as a generator such that the battery charge state moves between lower and upper limits. If a filter regeneration requirement is detected, the filter is regenerated by raising the temperature of the exhaust gas. When the need for filter regeneration is detected, the battery is discharged to below the lower limit, in the charge-depleting mode of the electrical machine, prior to the regeneration. Subsequently, to regenerate the filter, the engine is operated to raise the exhaust gas temperature by increasing the torque provided by the engine, and the electric machine operates as a generator to charge the battery and/or operate an auxiliary electrical load.

9 Claims, 1 Drawing Sheet

(51) Int. Cl.
*F02D 41/02* (2006.01)
*B60W 20/13* (2016.01)
(52) U.S. Cl.
CPC ...... *F02D 41/0245* (2013.01); *F01N 2430/00* (2013.01); *F02D 2041/026* (2013.01); *F02D 2200/0812* (2013.01); *F02D 2200/503* (2013.01)

(56) References Cited

FOREIGN PATENT DOCUMENTS

| DE | 10 2016 218 858 A1 | | 3/2018 | |
|---|---|---|---|---|
| FR | 2805222 A1 | * | 8/2001 | ............ B60W 10/02 |
| FR | 2828710 A1 | * | 2/2003 | ............. F01N 9/002 |
| FR | 2920474 A1 | * | 3/2009 | ............ B60W 20/13 |
| JP | 2015202832 A | * | 11/2015 | ............. B60K 6/445 |

OTHER PUBLICATIONS

Machine translation of JP-2015202832-A, accessed Sep. 29, 2021. (Year: 2021).*
Machine translation of DE-102014220860-A1, accessed Sep. 29, 2021. (Year: 2021).*
German Search Report Corresponding to 10 2019 202 210.3 dated Nov. 25, 2019.

* cited by examiner

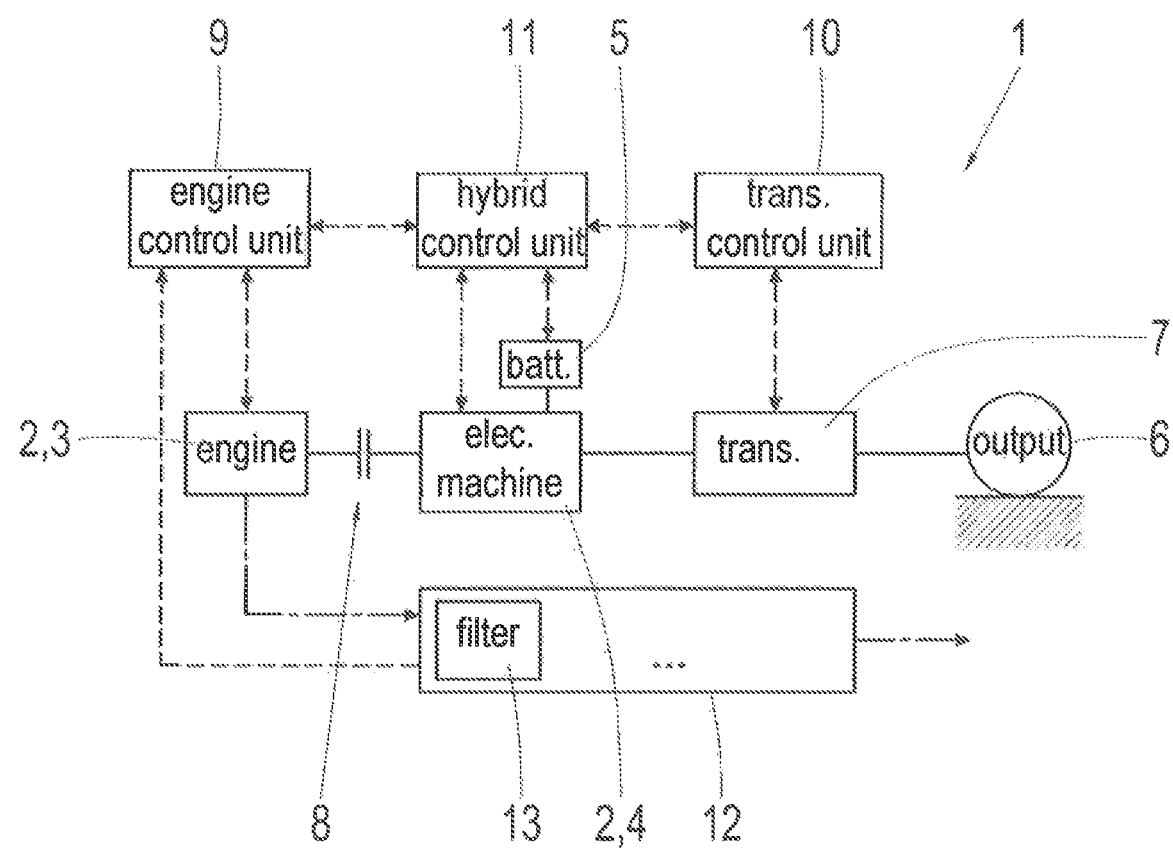

METHOD AND CONTROLLER FOR OPERATING A MOTOR VEHICLE

This application claims priority from German patent application serial no. 10 2019 202 210.3 filed Feb. 19, 2019.

FIELD OF THE INVENTION

The invention relates to a method for operating a drive train of a motor vehicle. Furthermore, the invention relates to a controller for executing the method.

BACKGROUND OF THE INVENTION

The drive unit of a hybrid vehicle comprises both an internal combustion engine and an electric machine. Fuel is burned in the combustion engine to provide drive power at an output of the hybrid vehicle via the combustion engine. The electric motor, on the other hand, converts electrical energy stored in an electrical energy storage device of the hybrid vehicle, which is designed as a traction battery, into drive power for the output. A transmission is installed between the drive unit and the output. The transmission converts rotational speeds and torques and in that provides the tractive power of the drive unit to the output. The discharge of the electrical energy storage device prevails during charge-depleting mode of the electric machine. During generator operation of the electric machine, the charging of the electrical energy storage device prevails. The electrical energy storage device is discharged and charged in such a way that the state of charge of the electrical energy storage device moves between a lower limit value and an upper limit value to ensure the longest possible service life of the electrical energy storage device.

Hybrid vehicles known from practice are also equipped with an exhaust gas aftertreatment system. Such an exhaust gas aftertreatment system typically has a particulate filter. In the particulate filter, particulates such as soot particles are filtered from the exhaust gas. It is important to regenerate the particulate filter from time to time to remove particles from the exhaust gas as effectively as possible. Therefore, the current filter loading status of a particulate filter can be determined in a manner known from practice. If the current filter loading state exceeds a loading limit or reaches this loading limit, a regeneration requirement for the particulate filter can be detected and the latter can then be subjected to regeneration.

A regeneration requirement for the particulate filter can also be determined in other ways, e.g. time-based, based on the operating hours or on the mileage.

It is known from practice to raise the exhaust gas temperature to regenerate a particulate filter. By raising the exhaust gas temperature, particles can be burned in the particulate filter to reduce its filter loading state.

From DE 10 2016 200 972 A1, a process for operating a drive train of a motor vehicle is known in which a particulate filter of an exhaust aftertreatment system is only regenerated if the combustion engine is operating in an operating range favorable for regeneration. By operating the electric machine as a generator or as a motor, an operating point of the internal combustion engine outside of the favorable operating range is moved into the favorable operating range when regeneration is performed. The operating range is even moved if the operating point reached without the shift is in the favorable operating range as it is. The electrical machine is operated in such a way that the state of charge of the electrical energy storage device corresponds to a target value midway between a lower limit value and an upper limit value for the state of charge of the electrical energy storage device.

A vehicle has to operate particularly efficiently during regeneration of the particulate filter.

SUMMARY OF THE INVENTION

Based thereon, the object of the invention is to create a novel process and a control unit of a drive train of a motor vehicle.

This object is achieved by a method for operating a drive train of a motor vehicle according to the independent claim(s).

According to the invention, when the need for regenerating the particulate filter is detected the electrical energy storage device is discharged to a state of charge below the lower limit value by charge-depleting mode of the electrical machine in preparation for regenerating the particulate filter.

Subsequently, to regenerate the particulate filter the internal combustion engine is operated to raise the exhaust gas temperature by increasing the torque provided by the internal combustion engine at a defined operating point, and the electric machine is operated as a generator, wherein the electrical energy generated by the electric machine is used to charge the electrical energy storage device and/or to operate at least one auxiliary electrical load of the motor vehicle.

In the invention presented here, it is proposed for the first time to prepare the drive train for the regeneration of the particulate filter by discharging the electrical energy storage device to a state of charge below the lower limit value using the charge-depleting mode of the electrical machine when the need for regenerating the particulate filter has been detected. The actual regeneration of the particulate filter of the exhaust aftertreatment system is only performed once this preparation has been completed.

For the actual regeneration of the particulate filter, the combustion engine is then operated at a defined operating point to raise the exhaust gas temperature by increasing the torque provided by the combustion engine. In addition, the electric machine, which is coupled to the combustion engine or is operatively connected thereto, is operated simultaneously as a generator. The electrical energy generated by the electrical machine is used to charge the electrical energy storage device and/or to operate the at least one auxiliary electrical load of the motor vehicle. In this way, the vehicle can be operated particularly efficiently during regeneration of the particulate filter of the exhaust gas aftertreatment system.

According to an advantageous further development, the electrical energy storage device is charged during regeneration of the particulate filter up to a charge level above the upper limit value. This can further increase the efficiency of vehicle operation during the regeneration of the particulate filter of the exhaust aftertreatment system.

If the motor vehicle has at least one auxiliary electrical load, electrical energy generated by the electrical machine during regeneration of the particulate filter is preferably used primarily for operating the at least one auxiliary electrical load within the permissible operating limits of the latter, with additional electrical energy generated being used to charge the electrical energy storage device. This aspect of the invention is based on the knowledge that it is particularly advantageous for a motor vehicle having at least one auxiliary electrical load to first use the electrical energy generated by the electrical machine during the regeneration of the particulate filter directly for operating the at least one auxiliary electrical load of the motor vehicle, i.e. without intermediate conversion into electrical energy stored in the electrical energy storage device. An auxiliary electrical load can, for example, be a DC-DC converter, a PTO drive, an electric motor of an air compressor of a compressed air system of the motor vehicle and/or an electric motor of an air conditioning compressor of an air conditioning system or cooling system/chiller of a motor vehicle.

The regeneration of the particulate filter is preferably performed when the motor vehicle is stationary, wherein for that purpose the drive unit is decoupled from the output and the torque provided by the combustion engine absorbed by the electric machine operated as a generator. The regeneration of the particulate filter is particularly advantageous when the vehicle is stationary.

The control unit according to the invention is defined in the independent claim(s).

BRIEF DESCRIPTION OF THE DRAWING

Preferred developments are presented in the subclaims and the description below. Exemplary embodiments of the invention will be described with reference to a sole drawing, without being limited thereto. The sole FIGURE shows a block diagram of a drive train of a motor vehicle to illustrate the invention.

DETAILED DESCRIPTION OF THE PREFERRED EMBODIMENTS

FIG. 1 shows a block diagram of a drive train 1 of a motor vehicle. The drive train 1 has a drive unit 2 having a combustion engine 3 and an electric machine 4. The electric machine 4 interacts with an electrical energy storage device 5, which is also called a traction battery.

Fuel is burned in the combustion engine 3 to provide drive power. When the electric machine 4 is operated as an engine while significantly discharging the electrical energy storage device 5, the electric machine 4 can provide drive power. When the electric machine 4 is operating like a generator, on the other hand, charging the electrical energy storage device 5 prevails.

A transmission 7 is installed between the drive unit 2 and an output 6 of the drive train 1. The transmission 7 converts rotational speeds and torques and thus provides the tractive power of drive unit 2 to output 6. The transmission 7 is preferably an automated manual transmission or an automatic manual transmission having several shift elements, which can be designed as frictional shift elements and/or as positive shift elements. The sole FIGURE also shows an optional clutch 8, which is installed between the combustion engine 3 and the electric machine 4.

The operation of the combustion engine 3 is controlled and/or regulated by an engine control unit 9. The operation of the transmission 7 is controlled and/or regulated by a transmission control unit 10. The operation of the electric machine 4 and the electrical energy storage device 5 is controlled and/or regulated by a hybrid control unit 11, wherein the hybrid control unit 11 can also be an integral part of the transmission control unit 10. According to the dotted double arrows of the sole FIGURE, the engine control unit 9 exchanges data with the combustion engine 3, the transmission control unit 10 exchanges data with the transmission 7 and the hybrid control unit 11 exchanges data with the electric machine 4 and the electrical energy storage device 5. Furthermore, the control units 9, 10 and 11 exchange data with each other.

The motor vehicle of the sole FIGURE also includes an exhaust gas aftertreatment system 12. According to the dotted and dashed arrow in FIG. 1, exhaust gas, which is produced during the combustion of fuel in the combustion engine 3, is fed to the exhaust gas aftertreatment system 12 to treat the exhaust gas. Such an exhaust gas aftertreatment system 12 can comprise different components. The exhaust gas aftertreatment system 12 comprises at least one particulate filter 13, which can be used to filter particles such as soot particles from the exhaust gas. As a further component, the exhaust gas aftertreatment system 12 may include a catalytic converter. A catalytic converter can be installed upstream or downstream of the particulate filter 13. In motor vehicles whose combustion engine 3 is designed as a diesel engine, the catalytic converter is typically designed as an SCR catalytic converter. In that case, the exhaust gas aftertreatment system 12 then comprises as a further assembly a device by means of which ammonia or an ammonia precursor substance can be introduced into the exhaust gas upstream of the SCR catalytic converter.

The particulate filter 13 of the exhaust aftertreatment system 12 is used to filter particulates from the exhaust gas of the internal combustion engine 3. The effectiveness of the particulate filter 13 depends on the so-called particulate filter loading. If the filter loading reaches or exceeds a loading limit, the particulate filter 13 has to be regenerated, wherein the latter can then be subjected to subsequent regeneration. The regeneration requirement of the particulate filter 13 can be determined by the exhaust gas aftertreatment system 12 in a manner known to a person skilled in the art and made available as an input variable, e.g. to the engine control unit 9.

As explained above, the electric machine 4 of the drive unit can be operated both as a motor and as a generator. In charge-depleting mode of the electrical machine 4, the discharge of the electrical energy storage device 5 prevails and if operated as a generator, the charging of the electrical machine 4 prevails. In this way, the state of charge of the electrical energy storage device 5 moves between an upper limit value and a lower limit value. This is used in particular to protect the electrical energy storage device 5 from rapid aging.

When the need for regenerating the particulate filter 13 is detected, the electrical energy storage device 5 is discharged to a state of charge below the lower limit value in the charge-depleting mode of the electrical machine 4 in preparation for regenerating the particulate filter 13. The actual regeneration of the particulate filter 13 is only performed after this preparation, namely by operating the combustion engine 3 at a defined operating point to raise the exhaust gas temperature while increasing the torque provided by the combustion engine 3. Simultaneously, the electric motor 4 coupled to the combustion engine 3 is operated as a generator. The electrical energy generated by the electric machine 4 when operated as a generator is used to charge the electrical energy storage device 5 and/or to operate at least one auxiliary electrical load of the motor vehicle.

If the motor vehicle has at least one auxiliary electrical load, any electrical energy generated by the electrical machine 4 during regeneration of the particulate filter 13 is primarily used to operate the at least one auxiliary electrical load within its permissible operating limits. In addition, any electrical energy which is not required by the at least one auxiliary load is then used to charge the electrical energy storage device 5. The auxiliary electrical load can be an electric motor of an air compressor of a compressed air system of the motor vehicle. Another auxiliary electrical load can be an electric motor of an air conditioning compressor of an air conditioning system or cooling system/chiller of the motor vehicle. Because any electrical energy generated during regeneration of the particulate filter 13 is primarily used to operate such an auxiliary load, no losses in the electrical energy storage device 5 are incurred during intermediate storage of the energy.

If the powertrain does not include an auxiliary electrical load, the electrical energy generated by the electrical machine 4 operated as a generator during the regeneration of the particulate filter 13 is primarily used to charge the electrical energy storage device 5.

In a particularly advantageous manifestation of the invention, provision is made that during the regeneration of the particulate filter 13 the electrical energy storage device 5 is charged up to a state of charge above the upper limit value. Accordingly, in preparation for regeneration, the lower limit value for the state of charge of the energy storage device 5 and during regeneration, the upper limit value for the state of charge of the energy storage device 5 are moved to operate the drive train of the motor vehicle particularly efficiently during regeneration.

The process described above is preferably performed for a stationary vehicle. When the motor vehicle is stationary, the drive unit 2 is separated from the output 6. This can be achieved, for instance, by shifting the transmission 7 to neutral or to a non-positive coasting gear. A drive-away clutch can also be connected between the drive unit 2 and the transmission 7, which is then opened to uncouple the drive unit 2 from the transmission 6. The torque provided by the combustion engine 3 during such a static regeneration is then absorbed exclusively by the electric machine 4 operated as a generator. As explained above, this electrical energy can be used to charge the electrical energy storage device 5 and/or to operate at least one auxiliary electrical load.

The particulate filter 13 can also be [cleaned] in the course of a so-called dynamic regeneration while the vehicle is moving. For this purpose, the drive unit 2 is coupled to the output 6. The torque generated during the regeneration of the particulate filter 13 is then taken from the electric machine 4 operated as a generator on the one hand and from the output 6 on the other hand. During the regeneration of the particulate filter 13 while driving, the power point of the combustion engine 3 is raised compared to the state of driving where no regeneration is performed, in such a way that more fuel is burned in the combustion engine 3 and accordingly the combustion engine 3 generates more torque, which the electric machine 4 converts into electrical energy, which is used to charge the electrical energy storage device 5 and/or to operate the at least one auxiliary electrical load.

The invention further relates to a control unit for performing the process described above. This control unit may be, for instance, the engine control unit 9. When the control unit detects a need for regenerating the particulate filter 13, the control unit prepares the regeneration of the particulate filter 13 by operating the electric machine 4 to discharge the electrical energy storage device 5 to a state of charge below the lower limit value. Subsequently, the control unit operates the combustion engine 3 at a defined operating point to raise the exhaust gas temperature by increasing the torque provided by the combustion engine 3 to regenerate the particulate filter 13. Simultaneously, the control unit operates the electric motor 4 coupled to the combustion engine 3 as a generator, which then generates electrical energy. The electrical energy is used to charge the electrical energy storage device 5 and/or to operate the at least one auxiliary electrical load of the motor vehicle.

REFERENCE NUMERALS 1 drive train
2 drive unit
3 internal combustion engine
4 electric machine
5 electrical energy storage device
6 output
7 transmission
8 clutch
9 engine control unit
10 transmission control unit
11 hybrid control unit
12 exhaust aftertreatment system
13 particulate filter

The invention claimed is:

1. A method for operating a motor vehicle having a drive unit which includes an internal combustion engine and an electric machine, a transmission installed between the drive unit and an output, an electrical energy storage device interacting with the electric machine, and an exhaust gas aftertreatment system for treating exhaust gas of the internal combustion engine and having a particulate filter, the method comprising:
  discharging the electrical energy storage device in a charge-depleting mode of the electrical machine and charging of the electrical energy storage device when the electrical machine is operated as a generator, such that a state of charge of the electrical energy storage device moves between a lower limit value and an upper limit value, and
  if a regeneration requirement for the particulate filter of the exhaust gas aftertreatment system is detected, subjecting the particulate filter to regeneration,
  raising an exhaust gas temperature of the exhaust gas exiting the internal combustion engine to regenerate the particulate filter of the exhaust gas aftertreatment system,
  when a need for regenerating the particulate filter is detected, discharging the electrical energy storage device to a state of charge below the lower limit value in the charge-depleting mode of the electrical machine, in preparation for regenerating the particulate filter, and
  subsequently, to regenerate the particulate filter, operating the combustion engine at a defined operating point such that more fuel is burned, compared to an operating point where the particulate filter is not being regenerated, to raise the exhaust gas temperature while increasing torque provided by the internal combustion engine, and
  during regeneration of the particulate filter, operating the electric machine as the generator and first, operating at least one auxiliary electrical load of the motor vehicle using electrical energy, generated by the electric machine, and then charging the electrical energy storage device using any remainder of the electrical energy generated by the electric machine.

2. The method according to claim 1, further comprising, directly using the electrical energy generated by the electrical machine during the regeneration of the particulate filter, without intermediate storage, first for operating the at least one auxiliary electrical load within permissible operating limits thereof, and then using the remainder of the electrical energy generated by the electric machine for charging the electrical energy storage device.

3. The method according to claim 2, further comprising driving at least one of an electric motor of a compressed-air compressor of a compressed-air system of the motor vehicle, and an electric motor of an air-conditioning compressor of an air-conditioning system or cooling system of the motor vehicle, as the at least one auxiliary electrical load to use the electrical energy generated by the electric machine during the regeneration of the particulate filter.

4. The method according to claim 1, further comprising, during the regeneration of the particulate filter, charging the electrical energy storage device up to a state of charge above the upper limit value.

5. The method according to claim 1, further comprising performing the regeneration of the particulate filter when the motor vehicle is stationary, and, for that purpose, decoupling the drive unit from the output and the torque provided by the internal combustion engine is absorbed by the electric machine operated as the generator.

6. The method according to claim 1, further comprising performing the regeneration of the particulate filter while the motor vehicle is moving, and, for that purpose, coupling the drive unit to the output and the torque provided by the internal combustion engine is absorbed by the electric machine operated as the generator and by the output.

7. A control unit for operating a motor vehicle having a drive unit including an internal combustion engine and an electric machine, a transmission installed between the drive unit and an output, an electrical energy storage device interacting with the electric machine, and an exhaust gas aftertreatment system having a particulate filter for treating exhaust gas of the internal combustion engine,
when the control unit detects a need for regeneration of the particulate filter, the control unit, in preparation for regenerating the particulate filter, operates the electrical machine as a motor to discharge the electrical energy storage device to a state of charge below a lower limit value,
subsequently, the control unit for regeneration of the particulate filter operates the internal combustion engine at a defined operating point such that more fuel is burned, compared to an operating point where the particulate filer is not being regenerated, to raise an exhaust gas temperature while increasing torque provided by the internal combustion engine and
the control unit operates the electric machine as a generator, and uses the electrical energy generated by the electric machine while regenerating the particulate filter first to operate at least one auxiliary electrical load of the motor vehicle and then uses any remainder of the electrical energy generated by the electric machine to charge the electrical energy storage device.

8. The control unit according to claim 7, wherein the control unit is set up to perform, on a control side, the method of:
discharging the electrical energy storage device in a charge-depleting mode of the electrical machine and charging of the electrical energy storage device when the electrical machine is operated as the generator, such that a state of charge of the electrical energy storage device moves between a lower limit value and an upper limit value, and
if a regeneration requirement for the particulate filter of the exhaust gas aftertreatment system is detected, subjecting the particulate filter to regeneration,
raising an exhaust gas temperature of the exhaust gas exiting the internal combustion engine to regenerate the particulate filter of the exhaust gas aftertreatment system,
when a need for regenerating the particulate filter is detected, discharging the electrical energy storage device to a state of charge below the lower limit value in the charge-depleting mode of the electrical machine, in preparation for regenerating the particulate filter, and
subsequently, to regenerate the particulate filter, operating the combustion engine at a defined operating point such that more fuel is burned, compared to an operating point where the particulate filter is not being regenerated, to raise the exhaust gas temperature while increasing torque provided by the internal combustion engine, and operating the electric machine as the generator such that electrical energy, generated by the electric machine, is first used in the method to operate the at least one auxiliary electrical load of the motor vehicle and then used to charge the electrical energy storage device.

9. A method of operating a motor vehicle having a drive unit including an internal combustion engine and an electric machine, a transmission installed between the drive unit and an output, an electrical energy storage device interacting with the electric machine, and an exhaust gas aftertreatment system having a particulate filter for treating exhaust gas of the internal combustion engine, the method comprising:
discharging the electrical energy storage device during a charge-depleting operation of the electrical machine and charging the electrical energy storage device in generator operation of the electrical machine such that a charge state of the electrical energy storage device moves between a lower limit value and an upper limit value;
detecting a regeneration requirement for the particulate filter of the exhaust gas aftertreatment system;
discharging the electrical energy storage device to a charge state below the lower limit value by the charge-depleting operation of the electrical machine in preparation for regenerating the particulate filter;
subsequently, operating the internal combustion engine, at a defined operating point, such that more fuel is burned, compared to an operating point where the particulate filter is not being regenerated, to raise a temperature of the exhaust gas while increasing torque provided by the internal combustion engine;
regenerating the particulate filter of the exhaust gas aftertreatment system with the exhaust gas exiting the internal combustion engine and having the raised temperature; and
during regeneration of the particulate filter, operating the electric machine as a generator, and first operating at least one auxiliary electrical load of the motor vehicle with electrical energy generated by the electric machine and then charging the electrical energy storage device with a remainder of the electrical energy generated by the electric machine.

* * * * *